(12) United States Patent
Bednarz et al.

(10) Patent No.: US 9,097,168 B2
(45) Date of Patent: Aug. 4, 2015

(54) BRACKET FOR AN AFTER-TREATMENT COMPONENT

(75) Inventors: Stephen M. Bednarz, De Kalb, IL (US); Satyajit Gowda, Bangalore (IN)

(73) Assignee: Electro-Motive Diesel, Inc., LaGrange, IL (US)

( * ) Notice: Subject to any disclaimer, the term of this patent is extended or adjusted under 35 U.S.C. 154(b) by 364 days.

(21) Appl. No.: 13/592,618

(22) Filed: Aug. 23, 2012

(65) Prior Publication Data
US 2014/0053540 A1 Feb. 27, 2014

(51) Int. Cl.
| | | |
|---|---|---|
| F01N 3/00 | (2006.01) | |
| A47B 96/06 | (2006.01) | |
| F01N 13/18 | (2010.01) | |
| F16M 13/02 | (2006.01) | |
| F01N 13/00 | (2010.01) | |

(52) U.S. Cl.
CPC ........ F01N 13/1822 (2013.01); F01N 13/1855 (2013.01); *F01N 13/00* (2013.01); *F01N 13/1844* (2013.01); *F16M 13/02* (2013.01)

(58) Field of Classification Search
CPC ............ F01N 13/1805; F01N 13/1811; F01N 13/1822; F16M 13/02
USPC .................. 248/205.1, 567, 638, 676; 60/322
See application file for complete search history.

(56) References Cited

U.S. PATENT DOCUMENTS

| | | | |
|---|---|---|---|
| 2,756,952 A * | 7/1956 | Gazley | ............................ 248/567 |
| 4,352,783 A | 10/1982 | Bailey | |
| 4,907,743 A | 3/1990 | Bouiller et al. | |
| 5,082,479 A | 1/1992 | Miller | |
| 5,273,249 A | 12/1993 | Peterson et al. | |
| 5,415,772 A | 5/1995 | Garcera et al. | |
| 5,445,469 A | 8/1995 | Huck et al. | |
| 8,052,770 B2 | 11/2011 | Ayshford et al. | |
| 8,715,578 B2 * | 5/2014 | Fukuda | .......................... 422/170 |
| 2010/0126791 A1 * | 5/2010 | Okada | ............................ 180/296 |
| 2010/0187383 A1 * | 7/2010 | Olsen et al. | .................... 248/201 |
| 2014/0124285 A1 * | 5/2014 | Kimijima et al. | .............. 180/309 |

FOREIGN PATENT DOCUMENTS

WO WO 2011/087819 7/2011

OTHER PUBLICATIONS

U.S. Appl. No. 13/592,641 of Stephen M. Bednarz et al., entitled "Mounting System for an After-Treatment Component" filed Aug. 23, 2012.

U.S. Appl. No. 13/592,633 of Stephen M. Bednarz et al., entitled "Mounting Foot for an After-Treatment Component" filed Aug. 23, 2012.

\* cited by examiner

*Primary Examiner* — Audrey K Bradley
*Assistant Examiner* — Anthony Ayala Delgado
(74) *Attorney, Agent, or Firm* — Finnegan, Henderson, Farabow, Garrett & Dunner, LLP

(57) ABSTRACT

A bracket for connecting an after-treatment component to a frame is disclosed. The bracket may have a clevis connectable to the after-treatment component. The bracket may also have a front link coupler. The front link coupler may have a tang connected to the clevis. The front link coupler may also have a first flange extending outward from the tang and a second flange extending outward from the tang opposite the first flange. In addition, the front link coupler may have a third flange spaced apart from the first flange and extending outward from the tang and a fourth flange spaced apart from the second flange and extending outward from the tang opposite the third flange. The first, second, third, and fourth flanges may be connectable to the frame.

18 Claims, 8 Drawing Sheets

BRACKET FOR AN AFTER-TREATMENT COMPONENT

TECHNICAL FIELD

The present disclosure relates generally to a bracket and, more particularly, to a bracket for an after-treatment component.

BACKGROUND

Internal combustion engines generate exhaust as a by-product of fuel combustion within the engines. Engine exhaust contains, among other things, unburnt fuel, particulate matter such as soot, and harmful gases such as carbon monoxide or nitrous oxide. To comply with regulatory emissions control requirements, engine exhaust must be cleaned before it is discharged into the atmosphere.

Engines typically include after-treatment devices that remove or reduce harmful gases and particulate matter in the exhaust. The after-treatment devices may be located in an after-treatment system mounted either on the engine or on a frame of a machine associated with the engine. An on-engine after-treatment system must meet a large number of criteria designed to ensure longevity and ease of use. For example, an on-engine after-treatment system should be capable of being assembled in a relatively limited amount of space. Moreover, the components used for mounting the after-treatment system must be able to withstand loads generated because of sudden changes in velocity or temperature, while maintaining general alignment of an exhaust inlet of the after-treatment system with an exhaust outlet from the engine.

An exemplary after-treatment system is disclosed in World Intellectual Property Organization International Publication No. WO 2011/087819 of Kiran et al. that was published on Jul. 21, 2011 ("the '819 publication"). Specifically, the '819 publication discloses a mounting system for an exhaust after-treatment system that is isolated from shock and vibration loads. The disclosed system includes isolators that attach the exhaust after-treatment system to a support structure. The '819 publication discloses two different types of isolators, namely stiff isolators and soft isolators. The stiff isolators are used at one end of the mounting system to limit movement of the after-treatment system at that end. The soft isolators are used in other locations to allow for thermal expansion.

Although the system of the '819 publication may be adequate for some situations, it may also be problematic. In particular, the stiff isolators may not sufficiently constrain movement of the exhaust inlet of the after-treatment system during operation of the machine. As a result, the exhaust inlet of the after-treatment system and the exhaust outlet of the engine may become misaligned or may induce stresses on the coupling between them. Further, the soft isolators may limit an amount of thermal expansion of the after-treatment system, thereby inducing stress in the after-treatment devices.

The bracket of the present disclosure solves one or more of the problems set forth above and/or other problems in the art.

SUMMARY

In one aspect, the present disclosure is directed to a bracket for connecting an after-treatment component to a frame. The bracket may include a clevis connectable to the after-treatment component. The bracket may also include a front link coupler. The front link coupler may include a tang connected to the clevis. The front link coupler may also include a first flange extending outward from the tang and a second flange extending outward from the tang opposite the first flange. In addition, the front link coupler may include a third flange spaced apart from the first flange and extending outward from the tang and a fourth flange spaced apart from the second flange and extending outward from the tang opposite the third flange. The first, second, third, and fourth flanges may be connectable to the frame.

In another aspect, the present disclosure is directed to a bracket for connecting an after-treatment component to a frame. The bracket may include a clevis connectable to the after-treatment component. The bracket may also include a front link coupler. The front link coupler may include a tang connected to the clevis. The front link coupler may also include a first flange extending orthogonally outward from the tang and a second flange extending orthogonally outward from the tang opposite the first flange. In addition, the front link coupler may include a third flange spaced apart from the first flange and extending outward from the tang at an angle of about 15 to 40° relative to a longitudinal axis of the after-treatment component. The front link coupler may also include a fourth flange spaced apart from the second flange and extending outward from the tang at an angle of about 15 to 40° relative to the longitudinal axis. The first, second, third, and fourth flanges may be connectable to the frame.

DETAILED DESCRIPTION

Figure 1:
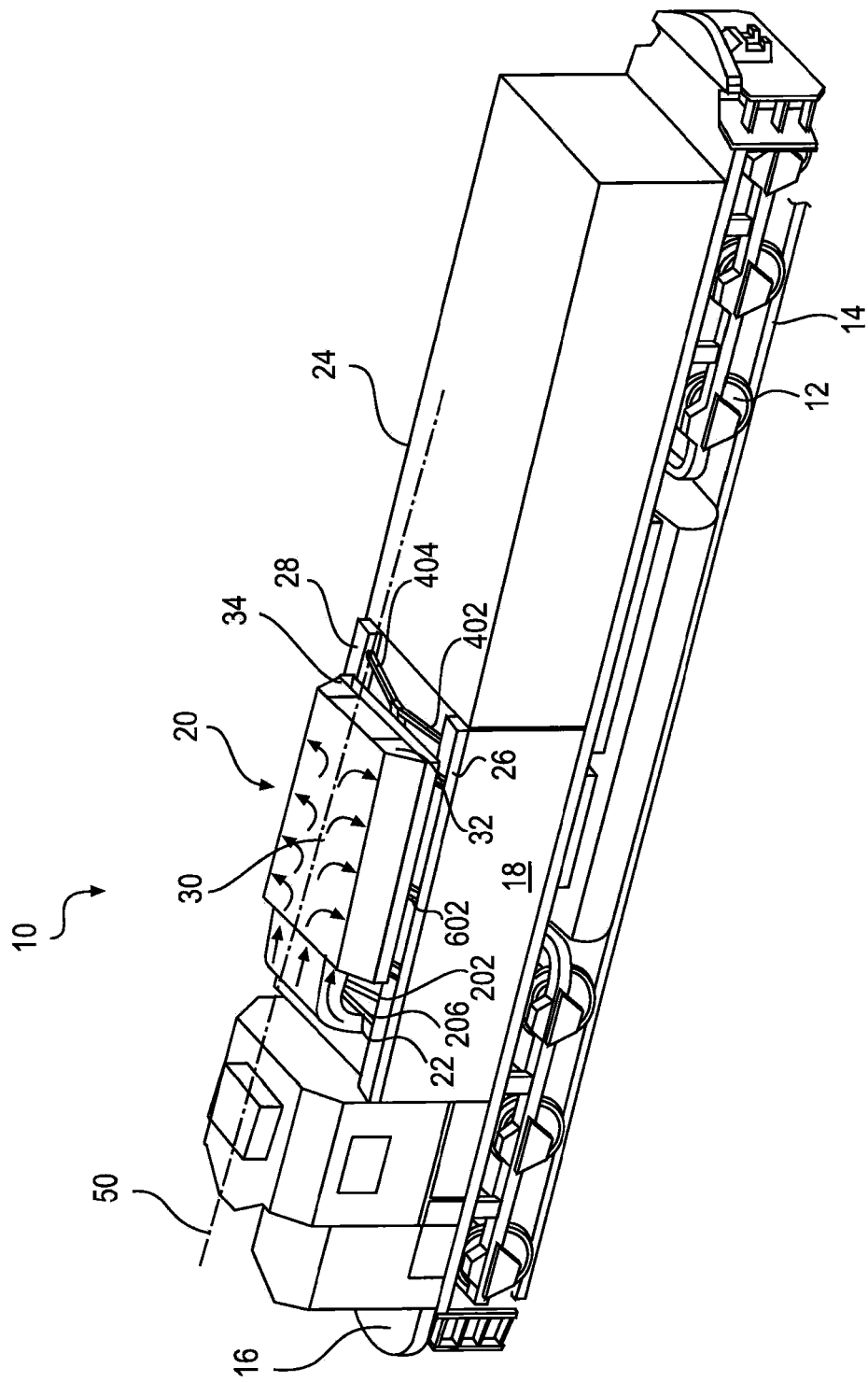
FIG. 1 is a pictorial illustration of an exemplary disclosed after-treatment component mounted to a machine.

FIG. 1 illustrates a machine 10 with an exemplary embodiment of an after-treatment component 20 mounted on machine 10. Machine 10 may be a mobile machine that performs some type of operation associated with an industry such as transportation, marine, mining, construction, farming, power generation, or any other industry known in the art. For example, machine 10 may be a locomotive designed to pull rolling stock. Machine 10 may have a plurality of wheels 12 configured to engage a track 14, a base platform 16 supported by wheels 12, and an engine 18 mounted to base platform 16 and configured to drive wheels 12. In the exemplary embodiment shown in FIG. 1, engine 18 may be lengthwise aligned on base platform 16 along a travel direction of machine 10. Although only one engine 18 is shown in FIG. 1, it is contemplated that any number of additional engines may be included within machine 10 and operated to produce power that may be transferred to one or more traction motors (not shown) used to drive wheels 12.

Engine 18 may be fluidly connected to after-treatment component 20, which may include multiple fluid paths that direct exhaust from engine 18 to the atmosphere. For example, exhaust from engine 18 may enter after-treatment component 20 via an inlet 22. After-treatment component 20 may be mounted on frame 24 of machine 10 by way of one or more rails 26, 28. Rails 26, 28 may be attached to an upper portion of frame 24 using welds, rivets, fasteners, or by any other means of attachment known in the art.

After-treatment component 20 may have a center plenum 30, which may separate into two outboard plenums 32 and 34, which may discharge exhaust to the atmosphere. Any number and type of exhaust treatment components may be located between center plenum 30 and outboard plenums 32 and 34.

After-treatment component 20 may undergo thermal expansion as a temperature of after-treatment component 20 increases from an ambient temperature to an operating temperature. In particular, dimensions of after-treatment component 20 may increase laterally in a plane generally orthogonal to a longitudinal axis 50 of after-treatment component 20. A length of after-treatment component 20 may also increase along longitudinal axis 50 because of thermal expansion. In one exemplary embodiment, the temperature of after-treatment component 20 may increase from about 650° F. during normal operation of machine 10 to about 1200° F. during a regeneration event. As a result, in one exemplary embodiment, after-treatment component 20 may laterally expand by about 0.25 to 0.38 inches and longitudinally expand by about 0.75 to 1.00 inches.

After-treatment component 20 may be attached to rails 26, 28 via links 202, 206, 402, and 404. After-treatment component 20 may also be supported on rails 26 and 28 via mounting feet 602. Although FIG. 1 illustrates four links 202, 206, 402, and 404, it is contemplated that any number links may be used to connect after-treatment component 20 to rails 26, 28.

Figure 2:
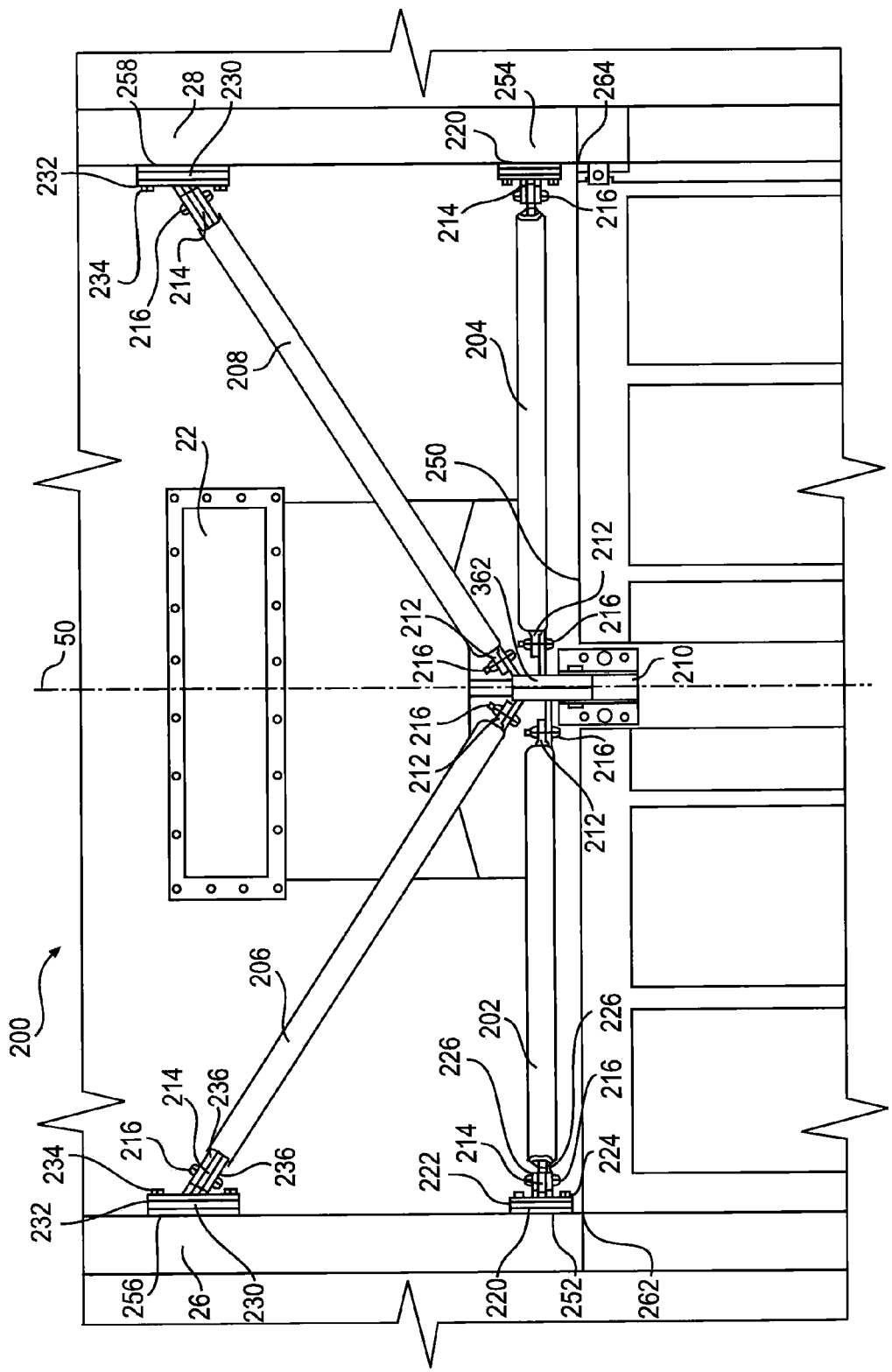
FIGS. 2-8 are pictorial illustrations of an exemplary disclosed mounting system for the after-treatment component of FIG. 1.

FIG. 2 shows a bottom view of a front attach arrangement 200 associated with after-treatment component 20. Specifically, FIG. 2 shows a view from below after-treatment component 20 looking upward at a front end 250 of after-treatment component 20. Front attach arrangement 200 may include a front center bracket 210 connected to front end 250 of after-treatment component 20. Front center bracket 210 may be fixedly attached to after-treatment component 20 using fasteners, rivets, welds, or by any other appropriate means of attachment known in the art. Front links 202, 204, 206, and 208 may connect front center bracket 210 to rails 26, 28. Front links 202, 204, 206, and 208 each may have a first end 212 and a second end 214. First ends 212 of front links 202, 204, 206, and 208 may be pivotally connected to front center bracket 210 via one or more fasteners 216. Second ends 214 of first and second front links 202 and 204 may be pivotally connected to first and second rails 26 and 28, respectively, via a pair of orthogonal rail brackets 220. Second ends 214 of third and fourth front links 206 and 208 may be pivotally connected to first and second rails 26 and 28, respectively, via a pair of angled rail brackets 230. First and second front links 202 and 204 may be disposed generally orthogonal to longitudinal axis 50. Third and fourth links 206 and 208 may be disposed at an angle with respect to longitudinal axis 50. In one exemplary embodiment, an angle between third and fourth links 206, 208 and longitudinal axis 50 may range from about 30° to 60°.

Orthogonal rail brackets 220 may be fixedly attached to first and second rails 26, 28 using fasteners, rivets, welds, or by any other appropriate means of attachment known in the art. Second end 214 of first front link 202 may be pivotally connected via one or more fasteners 216 to orthogonal rail bracket 220 at a first front location 252 adjacent to a first corner 262 of after-treatment component 20. Likewise, second end 214 of second front link 204 may be pivotally connected via one or more fasteners 216 to orthogonal rail bracket 220 at a second front location 254 opposite first front location 252 and adjacent to a second corner 264 of after-treatment component 20.

Orthogonal rail bracket 220 may include a generally flat base 222. Base 222 may be fixedly attached to first or second rails 26, 28 using one or more fasteners 224. Alternatively, base 222 may be fixedly attached to first or second rails 26, 28 using rivets, welds, or by any other appropriate means of attachment known in the art. Orthogonal rail bracket 220 may further include ears or tabs 226 extending generally orthogonal to base 222 away from rails 26, 28. Tabs 226 may be welded to base 222 or otherwise integrally formed with base 222. Tabs 226 may be disposed generally parallel to each other and generally orthogonal to longitudinal axis 50. Tabs 226 may be spaced apart to receive second ends 214 of first or second front links 202, 204 therebetween.

Angled rail brackets 230 may be fixedly attached to first and second rails 26, 28 using fasteners, rivets, welds, or by any other appropriate means of attachment known in the art. Second end 214 of third front link 206 may be pivotally connected via fastener 216 to angled rail bracket 230 at third front location 256 spaced apart from and on the same side as first front location 252. Second end 214 of fourth front link 208 may be pivotally connected via fastener 216 to angled rail bracket 230 at fourth front location 258 opposite third front location 256.

Angled rail bracket 230 may include a generally flat base 232. Base 232 may be fixedly attached to first or second rails 26, 28 using fasteners 234. Alternatively, base 232 may be fixedly attached to first or second rails 26, 28 using rivets, by welding or brazing, or by any other appropriate means of attachment known in the art. Angled rail bracket 230 may further include angled ears or tabs 236 extending outward at an angle from base 232. In one exemplary embodiment, an angle between angled ears or tabs 236 and base 232 may range from about 30° to 60°. Angled ears 236 may be integrally formed with base 232. Angled ears 236 may be disposed generally parallel to each other and generally at an angle relative to longitudinal axis 50. In one exemplary embodiment, an angle between angled ears or tabs 236 and longitudinal axis 50 may range from about 30° to 60°. Angled ears 236 may be spaced apart to receive second ends 214 of third or fourth front links 206, 208 therebetween.

Front center bracket 210 may be located at a predetermined distance above rails 26, 28. As a result, first and second front links 202 and 204 may form a V-shaped truss in a vertical plane. Likewise, third and fourth front links 206 and 208 may also form a V-shaped truss in a plane angled with respect to the vertical plane. Front links 202, 204, 206, and 208 may help reduce or eliminate movement of front center bracket 210 relative to frame 24. As a result, front links 202, 204, 206, and 208 may help ensure that inlet 22 of after-treatment component 20 remains aligned with an exhaust outlet of engine 18.

Figure 3:
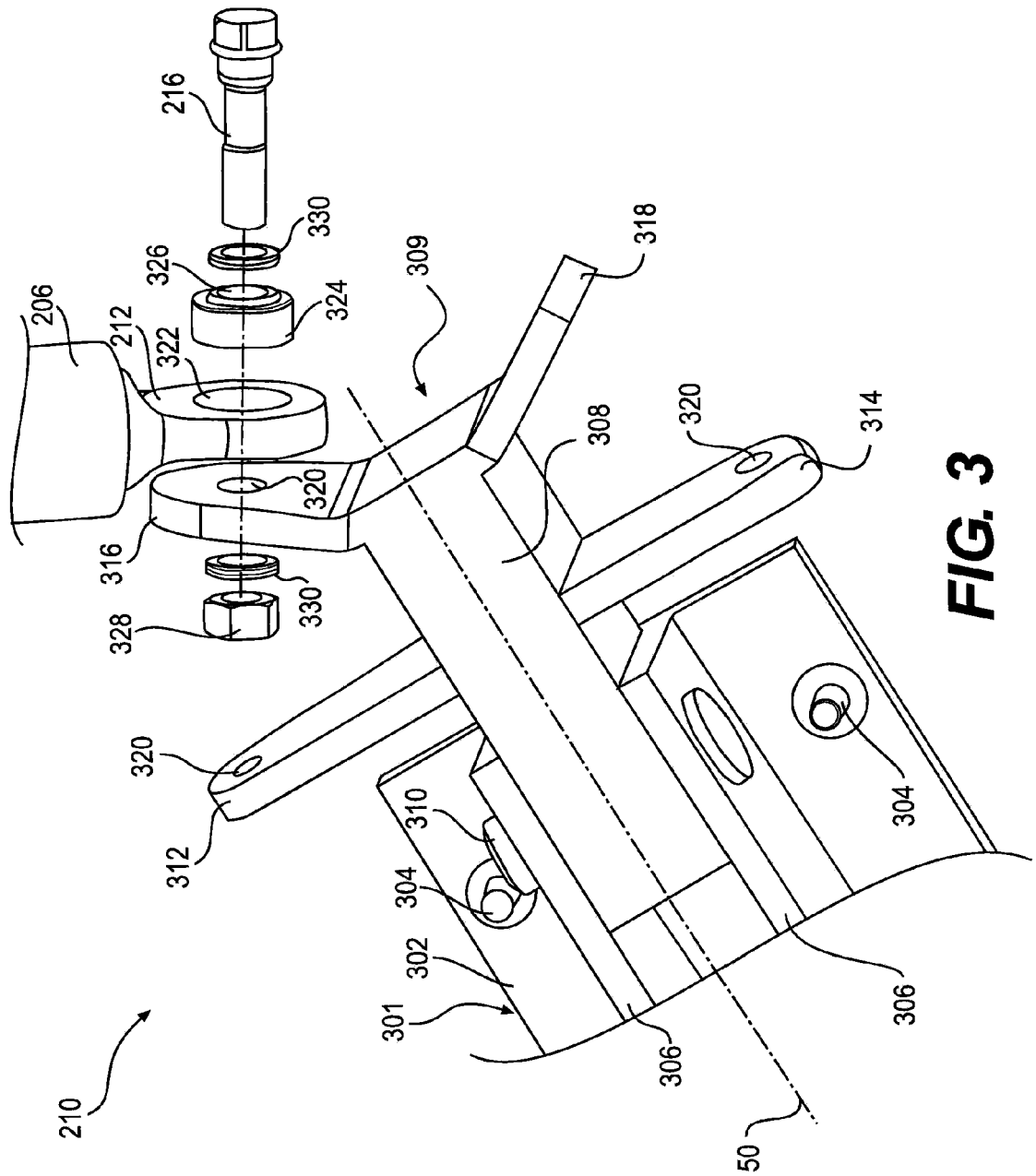

FIG. 3 illustrates one exemplary embodiment of front center bracket 210. Front center bracket 210 may include a clevis 301 and a front link coupler 309. As used in this disclosure, clevis refers to a substantially U-shaped structural member. For example, as shown in FIG. 3, clevis 301 may have a generally flat clevis base 302 that may be fixedly attached to after-treatment component 20 using one or more fasteners 304. Alternatively, clevis base 302 may be fixedly attached to after-treatment component 20 using rivets, by welding or brazing, or by any other appropriate means of attachment known in the art. As further illustrated in FIG. 3, Clevis 301 may have a pair of legs 306 extending outward generally orthogonal to clevis base 302. Legs 306 may be formed integral with clevis base 302. Legs 306 may be disposed parallel to longitudinal axis 50 and may be spaced apart to receive front link coupler 309 therebetween.

Front link coupler 309 may also include a tang 308. As used in this disclosure, tang refers to a bar shaped member that may be attached to a clevis. For example, as shown in FIG. 3, tang 308 may be pivotally connected to legs 306 using one or more fasteners 310 and may be slidably disposed between legs 306 of clevis 301. In one exemplary embodiment fastener 310 may be a shear pin. During assembly of after-treatment component 20 on frame 24, tang 308 may slide between and pivot relative to legs 306 to help ensure that after-treatment component 20 can be desirably positioned relative to frame 24. Front link coupler 309 may be designed to withstand thrust loads exerted along longitudinal axis 50 during operation of machine 10, thereby helping to reduce or eliminate movement of front center bracket 210 along longitudinal axis 50 in response to the thrust loads. In one exemplary embodiment, tang 308 may be designed to withstand thrust loads ranging from about 3 g to 5 g.

As shown in FIG. 3, a plurality of flanges 312, 314, 316, and 318 may be attached to tang 308. Flanges 312, 314, 316, and 318 may be integrally formed with tang 308. Alternatively, flanges 312, 314, 316, and 318 may be welded or attached to tang 308 by any other appropriate means of attachment known in the art. Flanges 312, 314, 316, and 318 may have a bore 320. Flanges 312 and 314 may extend outward on either side of tang 308 and may be disposed generally orthogonal to tang 308 and to longitudinal axis 50. Flanges 316 and 318 may also extend outward from tang 308 on either side. Flanges 316 and 318 may be disposed at an angle relative to longitudinal axis 50. In one exemplary embodiment, flanges 316, 318 may be disposed at an angle of about 15° to 40° relative to longitudinal axis 50. A relatively smaller angle may allow third and fourth front links 206 and 208 to form a relatively acute angled V-shaped truss, which may help prevent movement of front center bracket 210 along longitudinal axis 50. In some exemplary embodiments, a larger angle may be necessary to assemble after-treatment component 20 in the limited space available on machine 10.

As shown in FIG. 3, first end 212 of third front link 206 may be generally flat and may have a bore 322. A bearing 324 may be disposed within bore 322. In one exemplary embodiment, bearing 324 may be a spherical bearing, which may have a bore 326. Fastener 216 may pass through bore 326 in bearing 324 and bore 322 in flange 316 to engage a nut 328. One or more washers 330 may be interposed between fastener 216 and bearing 324 and also between flange 316 and nut 328. First ends 212 and second ends 214 of all front links 202, 204, 206, and 208 may have a structure similar to first end 212 of third front link 206 described above.

Figure 4:
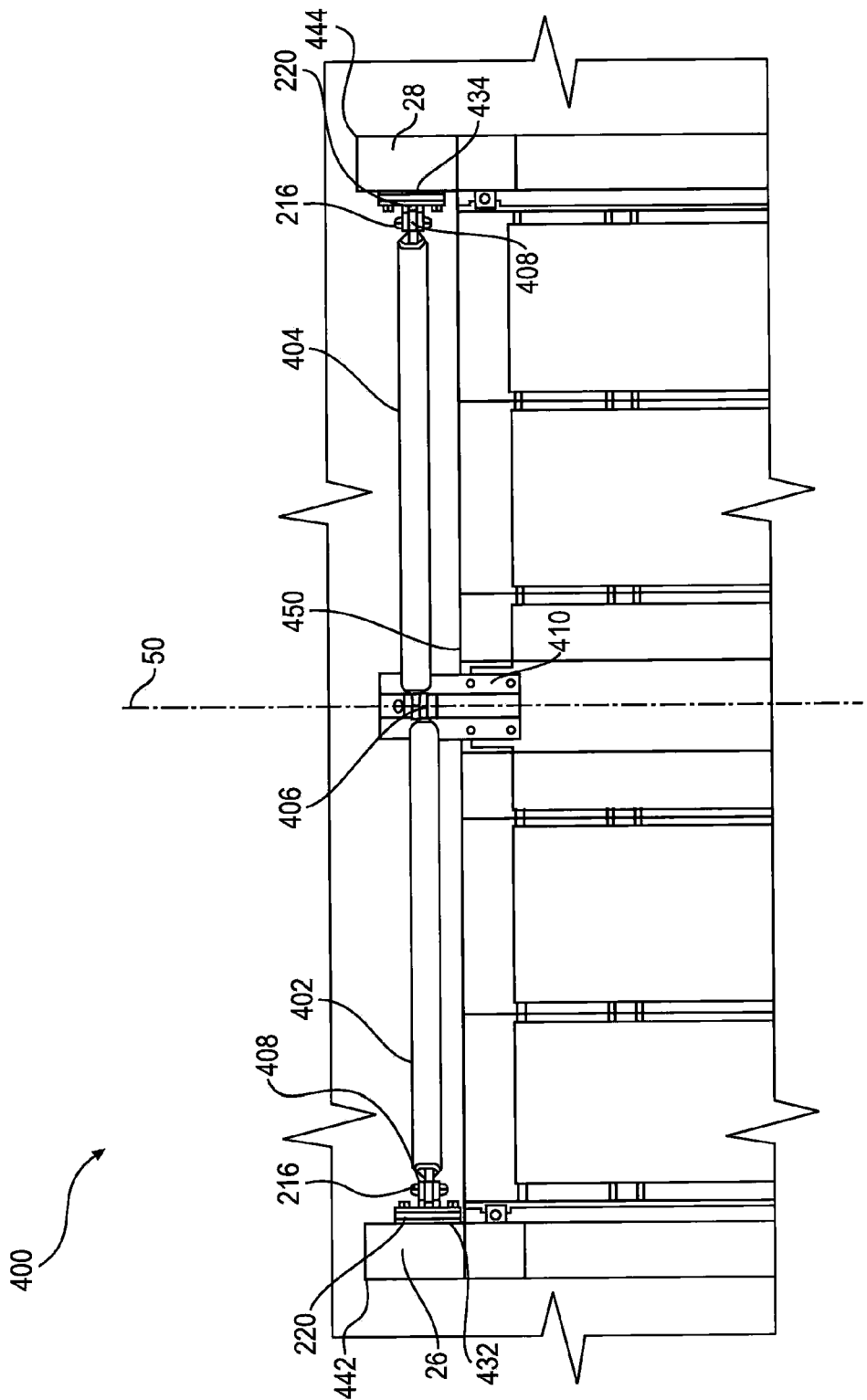

FIG. 4 shows a bottom view of a rear attach arrangement 400 of after-treatment component 20. Specifically, FIG. 4 illustrates a view from below after-treatment component 20 looking upward at a rear end 450 of after-treatment component 20. Rear attach arrangement 400 may include a rear center bracket 410 connected to rear end 450 via one or more fasteners, rivets, welds, or by any other means of attachment known in the art. Rear center bracket 410 may be connected to rails 26 and 28 via first and second rear links 402 and 404, respectively. First and second rear links 402 and 404 may each have a first end 406 and a second end 408. First ends 406 and second ends 408 of first and second rear links 402 and 404, respectively, may have a structure similar to first end 212 of third front link 206 described above. First ends 406 of first and second rear links 402 and 404 may be connected to rear center bracket 410 via one or more fasteners 216. Second ends 408 of first and second rear links 402,404 may be connected to first and second rails 26, 28, respectively, via orthogonal rail brackets 220. Orthogonal rail brackets 220 may be fixedly attached to first and second rails 26, 28 using fasteners, rivets, welds, or by any other appropriate means of attachment known in the art. Second end 408 of first rear link 402 may be pivotally connected via one or more fasteners 216 to orthogonal rail bracket 220 at a first rear location 432 adjacent to third corner 442 of after-treatment component 20. Likewise, second end 408 of second rear link 404 may be pivotally connected via one or more fasteners 216 to orthogonal rail bracket 220 at a second rear location 434, opposite first rear location 432 and adjacent to a fourth corner 444 of after-treatment component 20.

Rear center bracket 410 may be located at a predetermined distance above rails 26, 28. As a result, first and second rear links 402 and 404 may form a V-shaped truss in a vertical plane. First and second rear links 402, 404 may be oriented generally orthogonal to longitudinal axis 50 of after-treatment component 20. Further, first rear link 402 may be disposed so as to oppose movement of first end 406 of second rear link 404 in a plane orthogonal to longitudinal axis 50. Likewise, second rear link 404 may be disposed to oppose movement of first end 406 of first rear link 402 in a plane orthogonal to longitudinal axis 50. As a result, first and second rear links 402, 404 may help reduce or eliminate movement of rear end 450 in a plane orthogonal to longitudinal axis 50 and may also thereby help reduce or eliminate sideways movement of after-treatment component 20 relative to frame 24. First and second links 402, 404 may not constrain after-treatment component 20 from movement along longitudinal axis 50.

Figure 5:
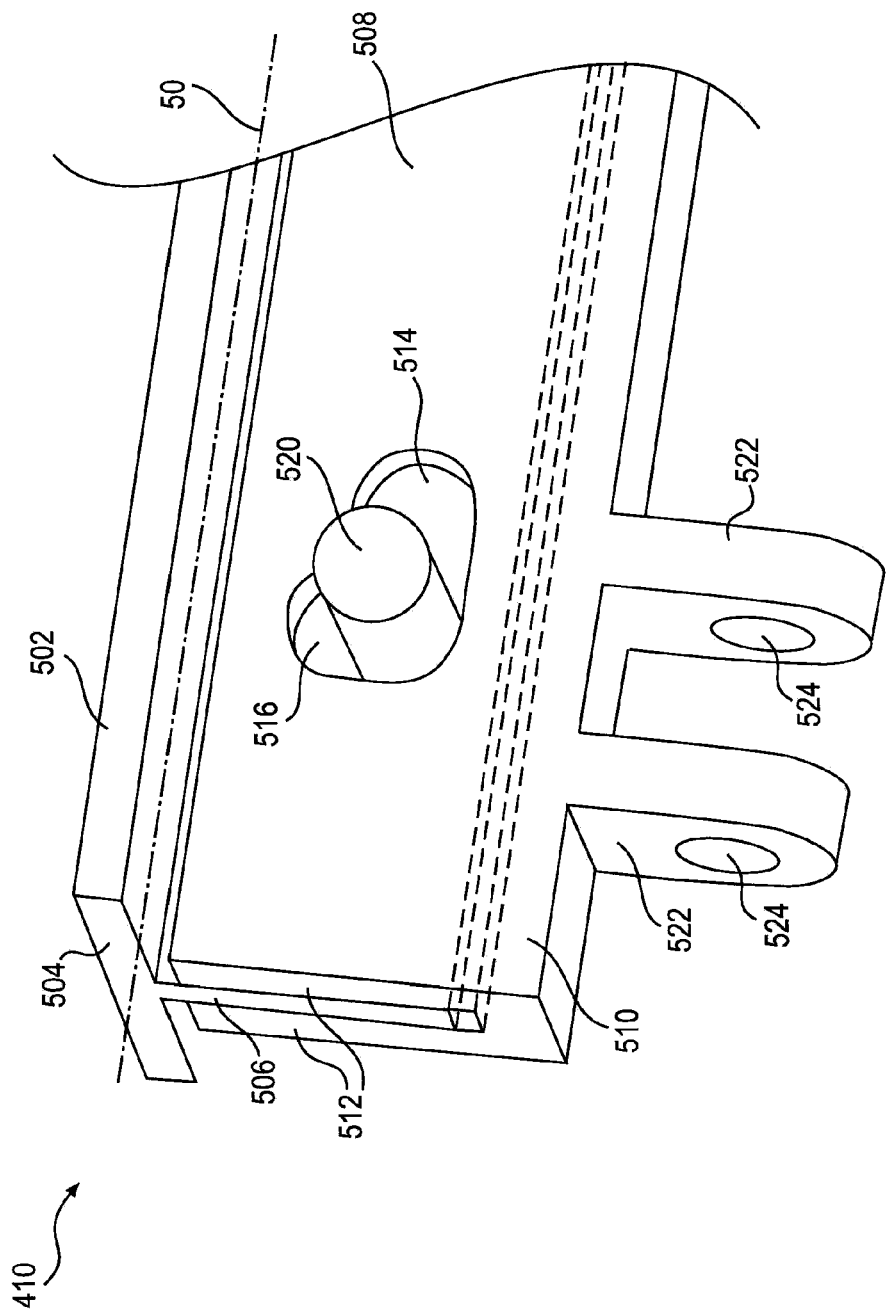

FIG. 5 illustrates an exemplary disclosed rear center bracket 410. Rear center bracket 410 may include a rail 502 having a base 504 and a protrusion 506 extending outward from and orthogonal to base 504. Protrusion 506 may be integrally formed with base 504. Rail 502 may be fixedly attached to after-treatment component 20 using fasteners, rivets, welds, or by any other appropriate means of attachment known in the art. Rail 502 may be lengthwise aligned with after-treatment component 20.

Rear center bracket 410 may also include rear link coupler 508 having a link coupler base 510 and legs 512 extending outward from and orthogonal to link coupler base 510. Legs 512 may be integrally formed with link coupler base 510. Legs 512 may be spaced apart to receive protrusion 506 of rail 502 therebetween.

Legs 512 may have a generally horizontal slot 514 and a generally vertical slot 516, which may at least partially overlap each other. A guide post 520 may extend outward from and orthogonal to protrusion 506 and be receivable within slots 514, 516. Guide post 520 may be attached to protrusion 506 and may extend orthogonally away from protrusion 506. Guide post 520 may be attached to protrusion 506 by welding, brazing, a threaded joint, press fit, or any other appropriate method of attachment known in the art. In one exemplary embodiment, guide post 520 may be cylindrical. It is contemplated, however, that guide post 520 may have a square, triangular, polygonal or any other appropriate cross-sectional shape known in the art.

Rail 502 may be slidably movable relative to rear link coupler 508. For example, when after-treatment component 20 experiences thermal expansion, rail 502 may slide relative to rear link coupler 508. Movement of rail 502 may be guided and limited in two directions by protrusion 506, guide post 520, and horizontal and vertical slots 514, 516.

Rear link coupler 508 may also have ears or tabs 522, which extend outward from and orthogonal to link coupler base 510 in a direction opposite legs 512. Ears 522 may be integrally formed with link coupler base 510. Alternatively, ears 522 may be attached to link coupler base 510 using fasteners, rivets, welds, or by any other appropriate means of attachment known in the art. Ears 522 may be disposed orthogonal to longitudinal axis 50 of after-treatment component 20 and orthogonal to legs 512. Ears 522 may have bores 524 with an axis generally parallel to longitudinal axis 50. Ears 522 may be spaced apart to receive first ends 406 of rear links 402, 404 therebetween. Fastener 216 may pass through bores 524 to pivotally connect first ends 406 of rear links 402, 404 to rear link coupler 508. Fastener 216 may also pass through bore 326 in bearing 324 and bore 322 in flange 316 to engage a nut 328. One or more washers 330 may be interposed between fastener 216 and bearing 324 and also between flange 316 and nut 328.

Front and rear links 202, 204, 206, 208, 402, and 404 may be tubular members. It is contemplated, however, that front and rear links 202, 204, 206, 208, 402, and 404 may have any other shape or cross-section known in the art. In one exemplary embodiment, front and rear links 202, 204, 206, 208, 402, and 404 may have a hollow circular cross-section. An inner diameter and an outer diameter of the hollow circular cross-section may be selected so that compressive stresses induced during operation of machine 10 within each link remain below buckling stresses. The inner and outer diameters of the hollow circular cross-section may also be selected such that front and rear links 202, 204, 206, 208, 402, and 404 may withstand buff, drag, and lateral loads, generated during operation of machine 10, without significant lengthwise deformation. In one exemplary embodiment, front and rear links 202, 204, 206, 208, 402, and 404 may be designed to withstand buff loads of up to about 5 g and lateral loads of up to about 1.5 g. Rear links 402 and 404 may be designed to withstand lateral loads of 1.5 g. In another exemplary embodiment, front and rear links 202, 204, 206, 208, 402, and 404 may be made out of mild steel, because mild steel has the desired structural properties, can be easily welded, and is also relatively inexpensive.

Figure 6:
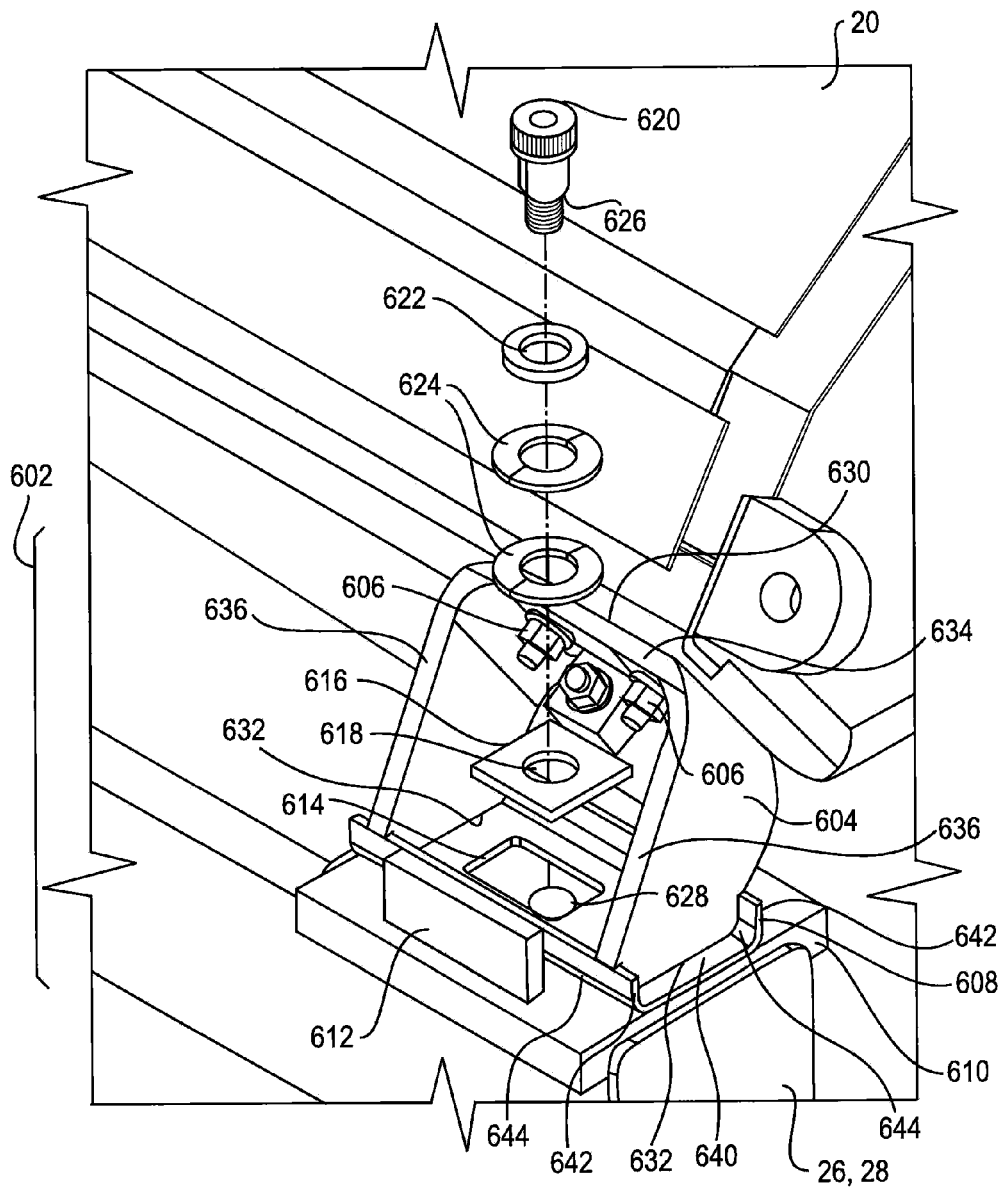

FIG. 6 illustrates an exemplary disclosed embodiment of a mounting foot 602. Mounting foot 602 may have a mounting bracket 604 connected at a first end 630 to after-treatment component 20 via fasteners 606. Mounting bracket 604 may be connected at a second end 632 opposite first end 630 to a slider 608, which may be slidably connected to a pad 610. Pad 610 may be fixedly connected to an upper portion of first or second rails 26, 28 using fasteners, rivets, welds, or any other attachment means known in the art. A stop 612 may be connected to an end of pad 610 using fasteners, rivets, welds, or any other attachment means known in the art. Stop 612 may extend orthogonal to pad 610 and away from frame 24. Stop 612 may be lengthwise aligned parallel to longitudinal axis 50 of after-treatment component 20. Stop 612 may limit an amount by which slider 608 may traverse pad 610. Mounting bracket 604 may be connected to pad 610 in a variety of ways. For example, mounting bracket 604 may be loosely connected to and constrained from significant movement relative to pad 610 using fasteners, rivets, welds, or any other appropriate method known in the art.

Mounting bracket 604 may include a mounting bracket base 634 and a pair of legs 636 extending orthogonally from mounting bracket base 634 towards slider 608. Distal ends 632 of legs 636 may be connected to slider 608. Mounting bracket base 634 may be disposed at an angle with respect to slider 608 to facilitate mating of mounting bracket with after-treatment component 20. In one exemplary embodiment, the angle between mounting bracket base 634 and slider 608 may be about 30° to 60°. Legs 636 may also be disposed at an angle with respect to slider 608. Disposing legs 636 at an angle may help reduce the frictional load between slider 608 and pad 610 because only a component of the weight exerted by after-treatment component 20 on mounting bracket 604 may contribute to the frictional load. In one exemplary embodiment, an angle between legs 636 and slider 608 may be about 30° to 60°. Legs 636 of mounting bracket 604 may be connected to slider 608 using fasteners, rivets, welds, or any other appropriate method known in the art.

As also shown in FIG. 6, slider 608 may include a generally flat slider base 640. Curved flanges 642 may extend orthogonally from slider base 640 away from pad 610. Curved flanges 642 may be integrally formed with slider base 640 or may be joined to slider base 640 using welds or any other appropriate method known in the art. Curved surfaces 644, formed at the joint of curved flanges 642 and slider base 640, may facilitate slidability of slider 608 on pad 610. For example, curved surfaces 644 may help slider base 640 slide on pad 610 when pad 610 has a rough or uneven surface or when impurities or dust particles are present on pad 610.

Slider base 640 may have a slot 614 formed therein. Slot 614 may be rectangular, square, circular, or may have any other appropriate shape known in the art. Mounting foot 602 may have plate 616, which may have a size larger than slot 614 so as to at least partially cover slot 614. Plate 616 may have a bore 618 and may be connected to pad 610 via fastener 620, which passes through washers 622 and 624, and bore 618 in plate 616. Threads on an end of fastener 620 may mate with corresponding threads in opening 628 in rail 26 or 28. Fastener 620 may be tightened so that mounting foot 602 is retained against first and second rails 26, 28 but allowed to slide somewhat along pad 610. Slider 608 and pad 610 may be made out of wear-resistant material to help prevent excessive wear on these parts during operation of machine 10. The materials used to make slider 608 and pad 610 may also be selected so as to create an anti-galling material pair. For example, slider 608 may be made out of Nitronic 60 and pad 610 may be made of mild steel, or vice-versa. In another exemplary embodiment, slider 608 and pad 610 may both be made out of Nitronic 60.

Fastener 620 may be a shoulder screw designed to maintain a predetermined gap between shoulder 626 and plate 616. A predetermined number of washers 622 may be interposed between shoulder 626 and plate 616 to help ensure that a desired amount of load is applied by fastener 620 on plate 616. The number of washers 622 selected may help ensure that the load applied by fastener 620 on plate 616 is not too high to prevent slider 608 from sliding on pad 610 due to thermal expansion of after-treatment component 20 and not too low such that slider 608 can slide on pad 610 under the influence of lateral forces. In one exemplary embodiment, the predetermined number of washers 622 may range from about 2 to 5 and the corresponding load applied by fastener 620 on plate 616 may range from about 3800 to 10000 lbs.

Figure 7:
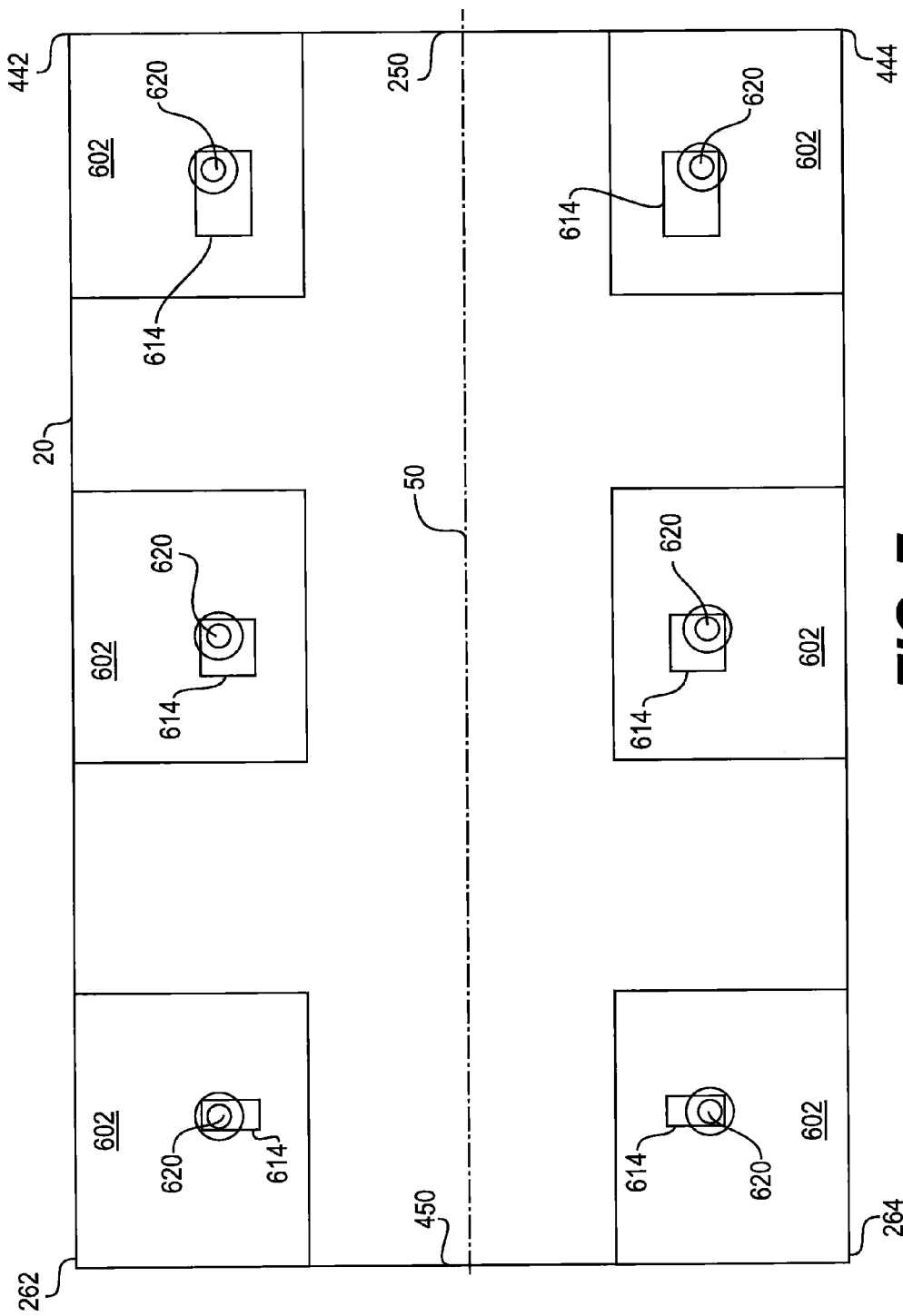

FIG. 7 is a pictorial illustration of mounting feet 602 of after-treatment component 20. As shown in FIG. 7, after-treatment component may have mounting feet 602 located near first and second corners 262, 264 of after-treatment component 20, near third and fourth corners 442, 444 of after-treatment component 20, and at locations between the first and third corners 262, 442 and between the second and fourth corners 264, 444. Mounting feet 602 may be located to appropriately distribute a weight of after-treatment component 20 on rails 26, 28. In one exemplary embodiment, mounting feet 602 may together carry about 5000-7000 lbs.

As further shown in FIG. 7, slot 614 may be sized differently according to a location along after-treatment component 20. For example, slots 614 on mounting feet 602 located adjacent to first and second corners 262, 264 of after-treatment component 20 may be rectangular and may be configured to allow mounting feet 602 to slide only in a direction orthogonal to longitudinal axis 50. For example, slots 602 located adjacent to first and second corners 262, 264 may have a width only slightly larger than fastener 620. Slots 614 in mounting feet 602 located at the midpoint of after-treatment component 20 may be larger and may allow mounting feet 602 to slide in both directions, parallel and orthogonal to longitudinal axis 50. Likewise, slots 614 in mounting feet 602 located adjacent to third and fourth corners 442, 444 of after-treatment component 20 may be the largest to allow mounting feet 602 to slide by a maximum amount in directions both parallel and orthogonal to longitudinal axis 50. As a temperature of after-treatment component increases from an ambient to the operating temperature, larger dimensional change may occur nearer third and fourth corners 442, 444 compared to near first and second corners 262, 264 where movement of after-treatment component 20 may be constrained by front links 202, 204, 206, and 208, and by slots 614.

Figure 8:
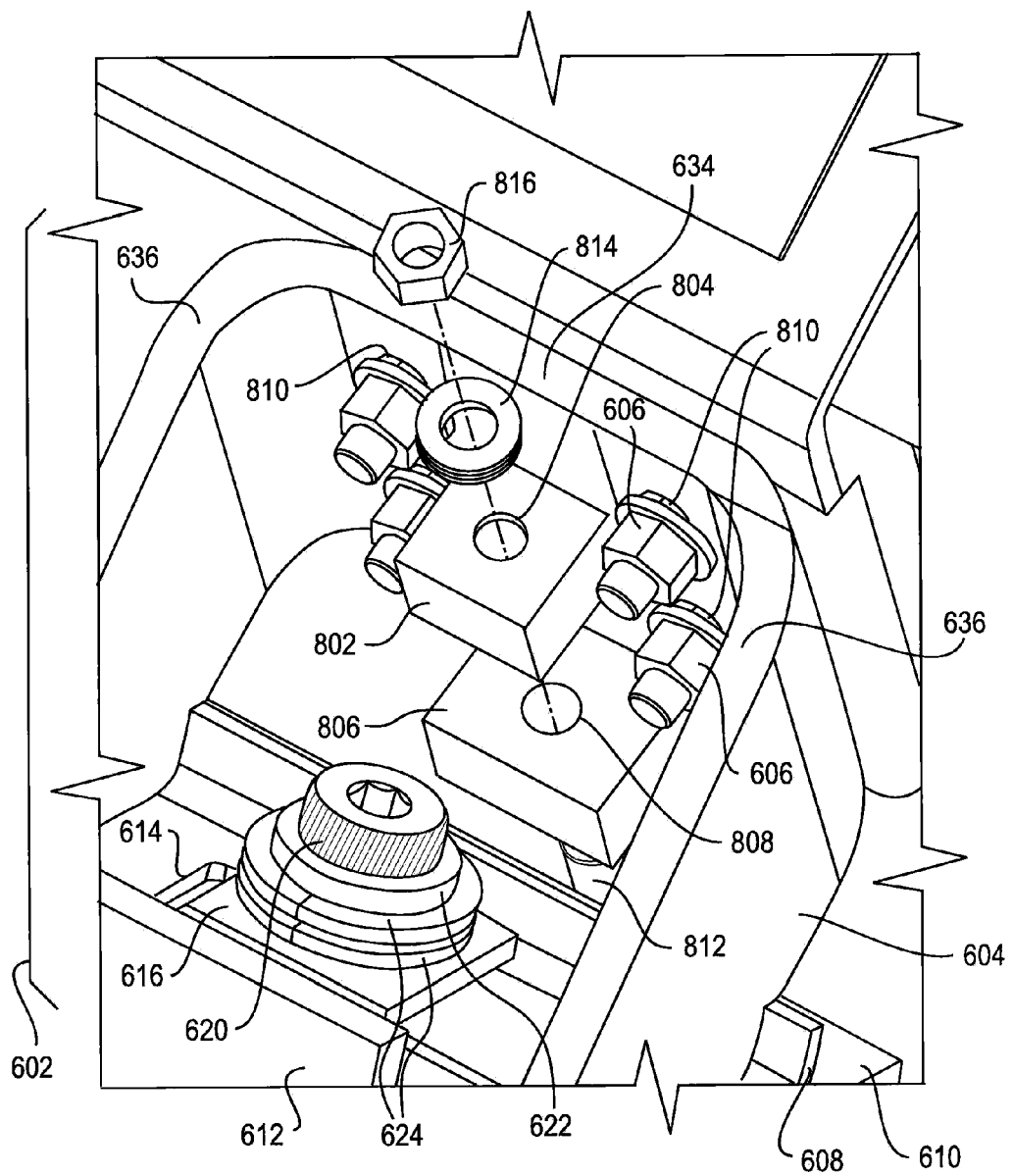

FIG. 8 illustrates an exploded view of another portion of mounting foot 602. As seen in FIG. 8, mounting bracket 604 of mounting foot 602 may have a first ledge 802 with a first bore 804. A second ledge 806 with a second bore 808 may be attached to after-treatment component 20. Second ledge 806 may be spaced apart from and disposed parallel to first ledge 802. Fasteners 606 may pass through elongated slots 810 in mounting bracket base 634. Jack screw 812 may pass through first and second bores 804 and 808 in first and second ledges 802 and 806, respectively, and may pass through washer 814 to mate with nut 816. Turning jack screw 812 may alter the distance between first and second ledges 802, 806. Because mounting bracket base 634 is disposed at an angle relative to slider 608, altering the distance between first and second ledges 802, 806 may allow after-treatment component 20 to be raised or lowered with respect to frame 24 to help align fastener openings (not shown) in after-treatment component 20 with elongated slots 810 in mounting bracket base 634 and to level mounting brackets relative to a plane formed by rails 26 and 28.

INDUSTRIAL APPLICABILITY

The disclosed mounting system may be used in any machine or power system application to secure an after-treatment component to the machine. In particular, the disclosed mounting system may be used to secure the after-treatment component when the after-treatment component may be subjected to buff loads, drag loads, lateral loads, and vibration loads. In addition, the disclosed mounting system may be used to secure an after-treatment component when the after-treatment component may be subject to thermal expansion caused by operation of the component. The mounting system may hold the after-treatment component in a desired position while still accommodating dimensional change caused by thermal expansion.

For example, the disclosed front links may help ensure that the center of the front end of the after-treatment component does not move either parallel to or orthogonal to the longitudinal axis of the after-treatment component. In this manner, the disclosed mounting system may help ensure that the inlet of the after-treatment component may remain substantially aligned with the exhaust outlet from an associated engine. The slots in the mounting feet near the front end of the after-treatment component may allow the mounting feet to slide orthogonal to the longitudinal axis of the after-treatment component while limiting the movement of the mounting feet parallel to the longitudinal axis. As a result dimensional changes induced by thermal expansion may be accommodated near the front end with most of the dimensional changes taking place nearer the rear end of the component.

The rear center bracket and the mounting feet nearer the rear end of the after-treatment system may allow the rear end of the after-treatment component to move along the longitudinal axis of the after-treatment component. In this manner, the disclosed mounting system, may allow thermal expansion to occur substantially unrestricted at the rear end thereby reducing or eliminating any additional thermally-induced stress. Further, the disclosed front and rear links may be designed so that they can absorb buff and lateral loads generated during operation of the machine. Specifically, the cross-sectional area of the front and rear links may be selected to ensure that the stresses generated in the front and rear links because of buff, and lateral loads do not exceed a buckling stress limit.

As discussed above with respect to FIG. 2, front links 202, 204, 206, and 208 may help ensure that front center bracket 210 is immovable either along longitudinal axis 50 or orthogonal to longitudinal axis 50. For example, first and second front links 202 and 204 may be disposed orthogonal to longitudinal axis 50, and attached to rails 26, 28 and front center bracket 210 so that each front link 202, 204 opposes any elongation or compression in the other front link. As such, front links 202 and 204 may form a V shaped truss having a very high resistance to deformations in a plane orthogonal to longitudinal axis 50 thereby helping to reduce or eliminate movement of front center bracket 210 in a plane orthogonal to longitudinal axis 50.

Third and fourth front links 206 and 208 may be oriented at an angle relative to longitudinal axis 50, and attached to rails 26, 28 and front center bracket 210 so that each front link 206, 208 opposes any elongation or compression in response to buff or drag loads. Front links 206, 208 may also form a V-shaped truss, having a very high resistance to deformations parallel to longitudinal axis 50 thereby helping to reduce or eliminate movement of front center bracket 210 along longitudinal axis 50.

Front center bracket 210 may help ensure that front end 250 of after-treatment component 20 remains substantially immovable during operation of machine 10. For example, flanges 312, 314 of front center bracket 210 may help orient first and second front links 202, 204 to form a V-shaped truss in a plane orthogonal to rails 26, 28. As discussed above, the V-shaped truss formed by first and second front links 202, 204 may reduce or eliminate movement of front center bracket 210 and front end 250 in a plane orthogonal to longitudinal axis 50. Flanges 316, 318 may similarly help orient third and fourth links 206, 208 to form a V-shaped truss which may help reduce or eliminate movement of front center bracket 210 and front end 250 along longitudinal axis 50. Thus, front center bracket 210 may cooperate with first, second, third, and fourth links 202, 204, 206, and 208 to help ensure that inlet 22 of after-treatment component 20 remains substantially aligned with an exhaust outlet from engine 18.

Mounting feet 602 located near front end 250 may anchor after-treatment component 20 to rails 26, 28 and permit thermal growth of after-treatment component 20 in a lateral direction (orthogonal to longitudinal axis 50 in a plane parallel to one formed by raisl 26, 28). In addition, as discussed above with respect to FIG. 7, slots 614 in mounting feet 602 located adjacent to first and second corners 242, 244 of after-treatment component 20 may be sized and oriented to prevent mounting feet 602 from sliding parallel to longitudinal axis 50. As a result, inlet 22 may remain in substantially the same position relative to an exhaust outlet of engine 18.

Further, as discussed above with respect to FIG. 2, rear links 402 and 404 may be disposed orthogonal to longitudinal axis 50, and attached to rails 26, 28 and rear link coupler 508 so that each of rear links 402, 404 opposes any elongation or compression in the other rear link. As such, rear links 402 and 404 may form a V shaped truss having a very high resistance to deformations in a plane orthogonal to longitudinal axis 50 thereby helping to reduce or eliminate movement of rear link coupler 508 and rear center bracket 410 in a plane orthogonal to longitudinal axis 50.

Protrusion 506 of rail 502 may slide between legs 512 of rear link coupler 508, thereby allowing rear end 450 of after-treatment component 20 to move as a result of thermal expansion. In addition, as discussed above with respect to FIG. 7, slots 614 in mounting feet 602 located adjacent to third and fourth corners 442, 444 of after-treatment component 20 may be sized and oriented to permit mounting feet 602 to slide orthogonal to and parallel to longitudinal axis 50 because of thermal expansion. In this manner, rear links 402 and 404, and mounting feet 602 may permit after-treatment component 20 to expand during operation, thereby preventing generation of thermally induced stresses in after-treatment component 20.

It will be apparent to those skilled in the art that various modifications and variations can be made to the disclosed bracket without departing from the scope of the disclosure. Other embodiments of the bracket will be apparent to those skilled in the art from consideration of the specification and practice of the mounting system disclosed herein. It is intended that the specification and examples be considered as exemplary only, with a true scope of the disclosure being indicated by the following claims and their equivalents.

What is claimed is:

1. A bracket for connecting an after-treatment component to a frame, comprising:
   a clevis, including:
      a generally flat clevis base connectable to the after-treatment component;
      a pair of legs extending outward from and orthogonal to the clevis base, the pair of legs being spaced apart from each other; and
   a front link coupler including:
      a tang connected to the clevis, the tang being disposed between the pair of legs of the clevis;
      a first flange extending outward from the tang;
      a second flange extending outward from the tang opposite the first flange;
      a third flange spaced apart from the first flange and extending outward from the tang; and
      a fourth flange spaced apart from the second flange and extending outward from the tang opposite the third flange, wherein the first, second, third, and fourth flanges are connectable to the frame.

2. The bracket of claim 1, wherein:
   the first and second flanges are disposed orthogonal to a longitudinal axis of the after-treatment component; and
   the third and fourth flanges are disposed at an angle with respect to the longitudinal axis of the after-treatment component.

3. The bracket of claim 2, wherein each of the first, second, third, and fourth flanges has a bore.

4. The bracket of claim 3, further including a fastener passing through the bore to connect a link to each of the first, second, third, and fourth flanges, wherein the link is connectable to the frame.

5. The bracket of claim 4, wherein the pair of legs are disposed parallel to the longitudinal axis of the after-treatment component.

6. The bracket of claim 5 wherein the tang is slidably connected to the clevis.

7. The bracket of claim 6, wherein the tang is pivotally connected to the pair of legs.

8. The bracket of claim 7, wherein the angle between each of the third and fourth flanges and the longitudinal axis of the after-treatment component is about 15 to 40°.

9. A bracket for connecting an after-treatment component to a frame, comprising:
   a clevis connectable to the after-treatment component; and
   a front link coupler including:
      a tang connected to the clevis;
      a first flange extending orthogonally outward from the tang;
      a second flange extending orthogonally outward from the tang opposite the first flange;
      a third flange spaced apart from the first flange and extending outward from the tang; and
      a fourth flange spaced apart from the second flange and extending outward from the tang opposite the third flange, wherein each of the third and fourth flanges is disposed at an angle of about 15 to 40° relative to a longitudinal axis of the after-treatment component, and wherein the first, second, third, and fourth flanges are connectable to the frame.

10. The bracket of claim 9, wherein the clevis includes:
   a generally flat clevis base connectable to the after-treatment component;
   a pair of legs extending outward from and orthogonal to the clevis base, the pair of legs being spaced apart to receive the tang therebetween.

11. The bracket of claim 10, wherein the tang is slidably connected to the clevis and pivotally connected to the pair of legs.

12. The bracket of claim 11, wherein the front link coupler can withstand thrust loads of about 3 g to 5 g.

13. An exhaust system, comprising:
   an inlet configured to receive exhaust from an engine;
   an outboard plenum configured to direct the exhaust to atmosphere;
   a frame mountable on a mobile machine;
   an after-treatment component mounted on the frame and configured to treat the exhaust received from the inlet before discharging the exhaust via the outboard plenum; and
   a bracket connected to the after-treatment component, the bracket including:
      a clevis, including:
         a generally flat clevis base connectable to the after-treatment component; and
         a pair of legs extending outward from and orthogonal to the clevis base, the pair of legs being disposed parallel to the longitudinal axis of the after-treatment component and spaced apart from each other;
      a tang connected to the clevis and disposed between the pair of legs of the clevis;
      a first flange extending outward from the tang;
      a second flange extending outward from the tang opposite the first flange;
      a third flange spaced apart from the first flange and extending outward from the tang; and
      a fourth flange spaced apart from the second flange and extending outward from the tang opposite the third flange; and
   a plurality of links connecting the first, second, third, and fourth flanges to a plurality of locations on the frame.

14. The exhaust system of claim 13, wherein:
   the first and second flanges are disposed orthogonal to a longitudinal axis of the after-treatment component; and the third and fourth flanges are disposed at an angle with respect to the longitudinal axis of the after-treatment component.

15. The exhaust system of claim 14 wherein the tang is slidably connected to the clevis.

16. The exhaust system of claim 15, wherein the tang is pivotally connected to the pair of legs.

17. The exhaust system of claim 16, wherein the angle between each of the third and fourth flanges and the longitudinal axis is about 15 to 40°.

18. The exhaust system of claim 17, wherein the tang can withstand thrust loads of about 3 g to 5 g.

\* \* \* \* \*